United States Patent [19]

Littauer et al.

[11] Patent Number: 4,481,266

[45] Date of Patent: Nov. 6, 1984

[54] REACTIVE METAL BATTERY HAVING CONTINUOUS SUPPLY OF CATHODE REACTANT

[76] Inventors: Ernest L. Littauer; William R. Momyer, both of c/o Lockheed Missiles & Space Company Inc., 1111 Lockheed Way, Sunnyvale, Calif. 94086

[21] Appl. No.: 478,695

[22] Filed: Mar. 25, 1983

[51] Int. Cl.³ .............................................. H01M 8/04
[52] U.S. Cl. ........................................ 429/12; 429/72; 429/80; 429/108; 429/110
[58] Field of Search ....................... 429/12, 14, 13, 27, 429/34, 40, 51, 72, 80, 108, 110, 118, 218

[56] References Cited

U.S. PATENT DOCUMENTS

| | | | |
|---|---|---|---|
| 3,525,645 | 8/1970 | Duddy | 429/13 |
| 3,758,339 | 9/1973 | Manion | 429/40 X |
| 3,769,090 | 10/1973 | Katz et al. | 429/14 |
| 3,791,871 | 2/1974 | Rowley | 429/118 |
| 3,823,038 | 7/1974 | Gidaspow et al. | 429/34 |
| 4,001,043 | 1/1977 | Momyer | 429/206 |
| 4,007,057 | 2/1977 | Littauer et al. | 429/57 |
| 4,126,733 | 11/1978 | Doniat | 429/12 |
| 4,269,907 | 5/1981 | Momyer et al. | 429/67 |

Primary Examiner—Anthony Skapars

[57] ABSTRACT

An improved porous cathode structure for use in a battery having a reactive metal electrode and flowed electrolyte. The cathode is preferably formed of an electrically conducting porous material with categorically active surface at an interface with the electrolyte. Alternatively, the cathode may be of an electrochemically reducible porous material and defines an active surface.

Structure is provided for delivering electrochemically reducible cathode reactant material continuously through the cathode to the cathode active surface during operation of the battery. The reactant material is delivered in an amount required to be reduced at the active surface to maintain high energy discharge rate with minimum amount of reactant material being utilized. The reactant material, in the illustrated embodiment, is provided from a storage supply and delivered to the porous cathode as needed during operation of the battery. In one form, the cathode is provided with distribution passages for conducting the reactant material therethrough. In another form, the reactant material is introduced through one or more edge portions of the cathode porous body for flow through the pores to the active surface.

15 Claims, 1 Drawing Figure

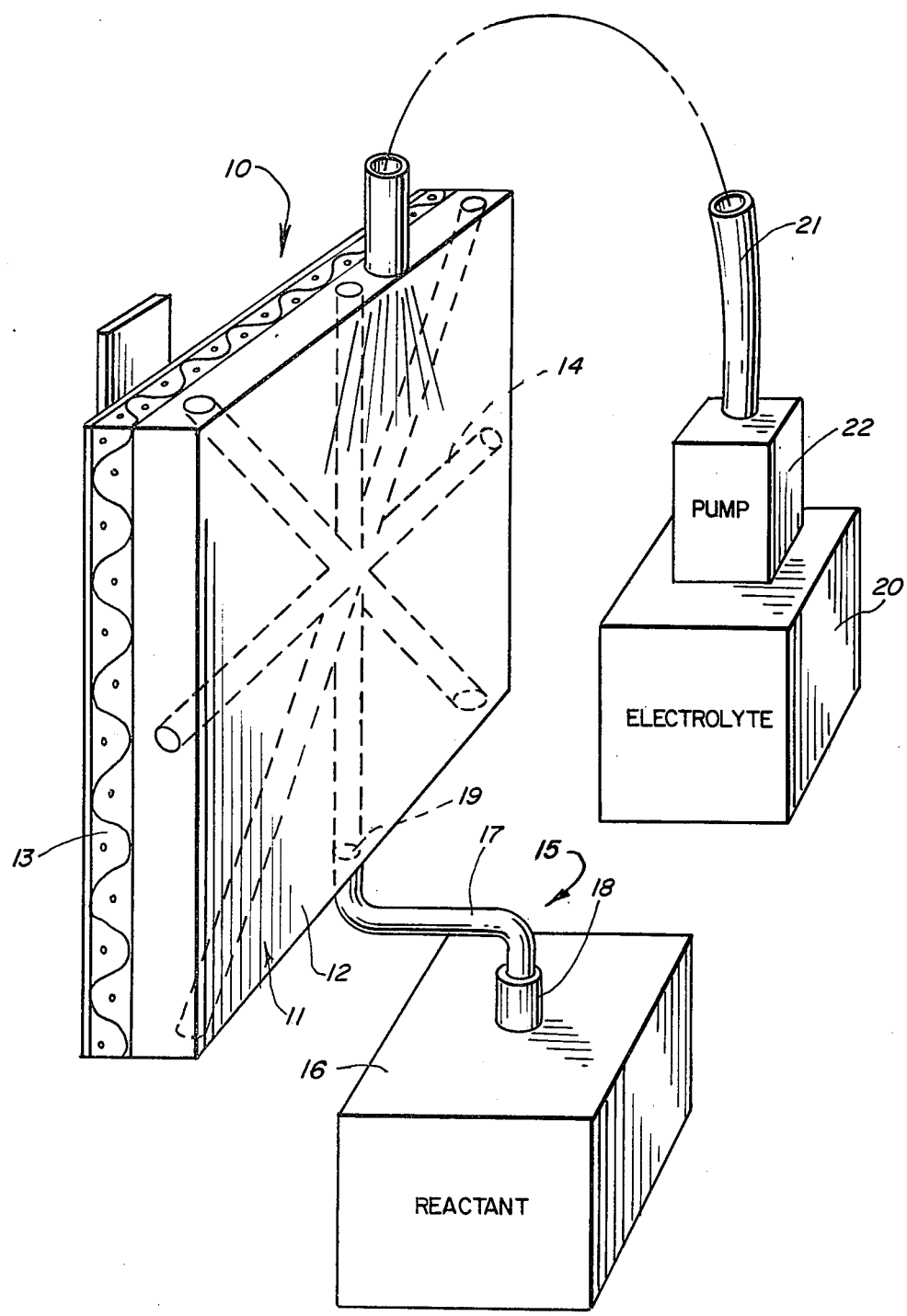

REACTIVE METAL BATTERY HAVING CONTINUOUS SUPPLY OF CATHODE REACTANT

The invention described herein was made in the course of or under Contract N00140-80-C-9959 with the United States Department of the Navy.

TECHNICAL FIELD

This invention relates to reactive metal batteries and in particular to means for providing cathode reactant in such batteries.

BACKGROUND ART

In one conventional form of reactive metal-aqueous electrolyte primary battery, the cathode comprises a solid electrochemically reducible element. The anode comprises a reactive metal, such as lithium, aluminum, magnesium, etc.

Typically, the cathodes are formed of silver chloride or silver oxide. In one illustrative form, the silver chloride cathode is utilized in a magnesium-sea water battery. An example of a silver oxide battery is that utilizing an aluminum anode with a sodium hydroxide electrolyte.

In such batteries, a discharge capacity has been found to be limited by the electrochemical energy content of the cathode material. In order to maintain acceptable discharge rates, the amount of active material incorporated into the cathode is limited. Thus, illustratively, in a silver oxide cathode, the conventional maximum capacity is approximately 17 to 23 ampere-minutes per gram. Silver chloride cathodes have significantly less electrochemical energy content.

One example of a reactive metal water electrochemical cell utilizing an alkaline electrolyte is disclosed in U.S. Letters Pat. No. 4,001,043 of William R. Momyer.

Other U.S. Letters Patent disclose the use of cathode reactants, such as hydrogen peroxide, soluble nitrites or other electrochemically reducible species, such as halogens, which are added to the electrolyte and reduced at the inert metal substrate. Illustratively, such additional prior art patents include U.S. Letters Pat. No. 4,007,057, U.S. Letters Pat. No. 4,001,043 of William R. Momyer, U.S. Letters Pat. No. 4,269,907 of William R. Momyer et al, and U.S. Letters Pat. No. 3,791,871 of Leroy F. Rowley, which patents are incorporated by reference herein.

In such batteries, a serious problem arises in that the cathode reactant, being added to the flowing electrolyte, is discharged into the environment during operation. Thus, a substantial amount of the unused reactant is wasted by being discharged with the electrolyte.

DISCLOSURE OF INVENTION

The present invention comprehends an improved porous cathode for use in a reactive metal battery.

More specifically, the invention comprehends the provision of a solid electrically conductive porous electrode, typically of carbon or compacted metal powders, or a structure manufactured with holes or other means to provide electrochemically reducible cathode reactant material through the cathode to the cathode active surface thereof during operation of the battery, in an amount required to be reduced thereat to maintain high energy discharge rates. For illustrative purposes, materials such as porous carbon from National Carbon Company, feltmetal from Brunswick Corporation, sintered porous metal plaques from Clevite, and foametal from Hogen Industries are all suitable as distribution systems for the cathode reactant. Alternatively, the electrode may comprise an electrochemically reducible porous structure.

In the illustrated embodiment, the structure for providing the reactant material through the cathode is defined by flow passages distributed therein for delivering the reactant material through the porous cathode material substantially uniformly to the active surface thereof.

The reactant material providing structure further includes a storage supply of the reactant material and apparatus for delivering the reactant material from the storage supply to the cathode as needed.

In one form of the invention, the structure for providing the reactant material is arranged to provide the material to an edge portion of the porous cathode to be flowed therethrough to the active surface portion.

In an illustrated embodiment, utilizing an electrochemically reducible active silver oxide cathode, the cathode is first reduced to metallic silver to yield the normal capacity of 17 to 23 ampere-minutes per gram of cathode material. Additional capacity can at this point be obtained from the cathode by supplying a cathode reactant to the resultant porous silver matrix which was produced by reduction of the silver oxide. The cathode capacity is then limited only by the available supply of cathode reactant.

The improved reactant providing means of the present invention is extremely simple and economical of construction while yet providing improved operation of the battery at high discharge rates.

BRIEF DESCRIPTION OF THE DRAWING

Other features and advantages of the drawing will be apparent from the following description taken in connection with the accompanying drawing wherein the FIGURE is a fragmentary perspective view of a porous cathode structure embodying the invention.

BEST MODE FOR CARRYING OUT THE INVENTION

In the exemplary embodiment of the invention as disclosed in the drawing, a cathode structure generally designated 10 comprises electrically conductive porous body 11 defining an active surface 12. A collector grid 13 of conventional construction is bonded to the opposite surface.

As shown in the drawing, the invention comprehends means for providing an electrically reducible cathode reactant material through the porous body 11 to the active surface 12 in an amount required to be reduced thereat in maintaining a high energy discharge rate of the battery. More specifically, as seen in the drawing, the reactant providing means may comprise a plurality of flow passages 14 distributed in the porous body 11 and means generally designated 15 for delivering reactant material for flow through the passages to the different areas of the reactant surface 12.

In the illustrated embodiment, the reactant providing means includes a storage supply 16 of the reactant material, a transfer duct 17 from the storage supply to the passages 14, and a suitable pump 18 for effecting controlled delivery of the reactant material to the porous body 11. Suitable reactant material include without limitation hydrogen peroxide, lithium peroxide, soluble nitrites, bromates, chlorates, sulfites, dinitrogen trioxide and hypochlorites.

In the illustrated embodiment, duct 17 opens to a port 19 at the bottom of body 11 and the passages extend through the body 11 for improved uniform distribution of the reactant material to the active surface 12 of the cathode.

The operation of pump 18 is controlled so as to permit provision of only that amount of reactant to the cathode as is immediately needed to be reduced at the surface 12 so that no significant amount of unreacted reactant material is transferred to the electrolyte and, thus, optimum use of the reactant material in maintaining high energy discharge rates is provided.

As seen in the drawing, the electrolyte is delivered from a storage supply 20 through a suitable duct 21 provided with a delivery pump 22 for impingement on the active surface 12 in operation of the battery. As indicated above, the electrolyte is discharged after flowing over the cathode surface 12 and, thus, by correlating the amount of reactant material delivered to the surface 12 to that necessary to be reduced thereat, an improved high efficiency operation of the battery is obtained.

Thus, the cathode structure, when formed of silver oxide, may have an ampere-minutes per gram capacity which is substantially greater than the conventional limit of 17-23. Similarly, where other types of materials, which may or may not be electrochemically reducible, are employed significantly higher maximum capacity is obtained by means of the present invention because the reactant is provided to the reaction site rather than to the bulk of the electrolyte solution.

The invention comprehends the provision of the reactant material from the storage supply through the porous cathode by any suitable means in addition to the distribution passages 14 as discussed above, within the scope of the invention. Thus, illustratively, the reactant material may be delivered to one edge of the porous cathode for flow through the porous cathode to the active surface 12. The reactant material may be delivered through one edge, such as the lower edge thereof, or to a plurality or all of the edges as desired.

Industrial Applicability

The improved cathode structure of the present invention permits substantially increased electrochemical capacity of the battery as the capacity limit is controlled solely by the amount of reactive anode metal provided, inasmuch as a substantially inexhaustible supply of cathode reactant may be provided in the reactant storage supply.

In the illustrated embodiment, the cathode porous body 12 had a thickness of approximately 8 mils and the current collector grid 13 had a thickness of approximately 4 mils. It has been found that the use of such a thin cathode body permits facilitated flow of the reactant material through the interstitial pores thereof to the active surface 12 so that there is a continuous supply of the cathode reactant available for optimum efficiency in the operation of the battery, while yet, as discussed above, the amount of reactant material necessary is effectively minimized by avoiding waste thereof by discharge of unused reactant with the discharged electrolyte.

The foregoing disclosure of specific embodiments is illustrative of the broad inventive concepts comprehended by the invention.

We claim:
1. A battery comprising a reactive metal electrode, flowed electrolyte, porous cathode structure defining a catalytically active surface at an interface with said electrolyte, and means for providing electrochemically reducible soluble cathode reactant material through the cathode to said active surface during operation of the battery in an amount sufficient to be reduced at said surface to maintain a high energy discharge rate.

2. The battery of claim 1 wherein said cathode comprises a solid electrochemically reducible porous material.

3. The battery of claim 1 wherein said reactant material providing means comprises means defining flow passages distributed through said cathode to deliver the reactant material through the porous cathode material substantially uniformly to the active surface thereof.

4. The battery of claim 1 wherein said reactant material providing means comprises means defining flow passages distributed through said cathode to deliver the reactant material through the porous cathode material substantially uniformly to the active surface thereof, means for storing a supply of the reactant material, and means for delivering the reactant material from the storing means to the cathode as needed.

5. The battery of claim 1 wherein said reactant material providing means comprises means for storing a supply of the reactant material, and means for delivering the reactant material from the storing means to an edge portion of the cathode to be flowed through the porous cathode as needed.

6. The battery of claim 1 wherein said reactant material providing means comprises means for storing a supply of the reactant material, and means for delivering the reactant material from the storing means to a lower edge portion of the cathode to be flowed through the porous cathode as needed.

7. The battery of claim 1 wherein said reactant material is selected from the group consisting of hydrogen peroxide, lithium peroxide, nitrites, bromates, chlorates, sulfites, dinitrogentrioxide, and hypochlorites.

8. The battery of claim 7 wherein said reactant material comprises soluble peroxide ions.

9. The battery of claim 1 wherein said reactant material comprises a halogen.

10. A battery comprising a reactive metal electrode, flowed electrolyte, a solid electrochemically reducible porous cathode defining an active surface with an inert metal substrate juxtaposed thereto, and means for providing electrochemically reducible soluble cathode reactant material through the cathode to the cathode active surface adjacent to said inert metal substrate during operation of the battery in an amount sufficient to be reduced at said surface to maintain a high energy discharge rate, the reduced reactant material being removed therefrom as it is formed, by the flowed electrolyte.

11. The battery of claim 10 wherein said cathode comprises a thin wall member having reactant metal distribution passages formed therein.

12. The battery of claim 10 wherein said cathode comprises silver oxide active material and said reactant is provided in sufficient quantity to provide a capacity of greater than approximately 23 ampere-minutes per gram of reactant.

13. The battery of claim 10 wherein said reactant material is selected from the group consisting of hydrogen peroxide, lithium peroxide, nitrites, bromates, chlorates, sulfites, dinitrogentrioxide, and hypochlorites.

14. The battery of claim 13 wherein said reactant material comprises a peroxide.

15. The battery of claim 10 wherein said reactant material comprises a halogen.

* * * * *